United States Patent [19]
Everett, Jr.

[11] Patent Number: 5,276,618
[45] Date of Patent: Jan. 4, 1994

[54] DOORWAY TRANSIT NAVIGATIONAL REFERENCING SYSTEM

[75] Inventor: Hobart R. Everett, Jr., San Diego, Calif.

[73] Assignee: The United States of America as represented by the Secretary of the Navy, Washington, D.C.

[21] Appl. No.: 846,486

[22] Filed: Feb. 26, 1992

[51] Int. Cl.$^5$ .............................................. G06F 15/50
[52] U.S. Cl. ................... 364/424.02; 364/449; 364/516; 180/167
[58] Field of Search .............. 364/424.02, 449, 447, 364/424.07, 516, 517, 429; 340/988; 250/202

[56] References Cited

U.S. PATENT DOCUMENTS

| | | | |
|---|---|---|---|
| 4,500,970 | 2/1985 | Daemmer | 364/513 |
| 4,638,445 | 1/1987 | Mattaboni | 364/513 |
| 4,751,658 | 6/1988 | Kadonoff et al. | 364/513 |
| 4,779,203 | 10/1988 | McClure et al. | 364/424.02 |
| 4,846,297 | 7/1989 | Field et al. | 364/424 |
| 4,905,151 | 2/1990 | Weiman et al. | 364/424.02 |
| 5,040,116 | 8/1991 | Evans, Jr. et al. | 364/424.02 |
| 5,073,749 | 12/1991 | Kanayama | 318/587 |
| 5,109,340 | 4/1992 | Kanayama | 364/424.02 |
| 5,111,401 | 5/1992 | Everett, Jr. et al. | 364/424.02 |
| 5,155,684 | 10/1992 | Burke et al. | 364/424.02 |

OTHER PUBLICATIONS

Röning et al., "A 3-D Scene Interpreter for Indoor Navigation", IEEE International Workshop on Intelligent Robots and System, IROS '90, pp. 695–701.
Isik et al., "Pilot Level of a Hierarchical Controller for an Unmanned Mobile Robot", 1988 IEEE, pp. 241–255.

*Primary Examiner*—Thomas G. Black
*Assistant Examiner*—Tan Q. Nguyen
*Attorney, Agent, or Firm*—Harvey Fendelman; Thomas Glenn Keough

[57] ABSTRACT

A system of navigational referencing for a robot moving within a defined space is provided. A database contains x-y coordinate positional information on a plurality of doorway openings in terms of an x-y coordinate system. A mobile robot is provided that has the capability to access the database, define its location in terms of an approximate position within the defined space, and sense the presence of one of the plurality of doorway openings. The robot is positioned and moved along a path that traverses the one doorway opening at a known speed. The doorway opening's top door frame is detected from first and second sensor positions on the robot. The first and second sensor positions are separated by a known distance along a line orthogonal to the path that traverses the one doorway opening. An angular orientation of the robot is based on a time difference between when the first and second sensor positions detect the top door frame, the known speed of the robot and the known separation distance between the first and second sensor positions. A y-coordinate position of the robot is based on the positional information from the database when the first or second sensing position detects the top door frame. A lateral position of the robot is determined during a portion of the time between when the first and second sensor positions detect the top door frame. The lateral position is compared with the positional information from the database in order to determine an x-coordinate of the robot.

11 Claims, 4 Drawing Sheets

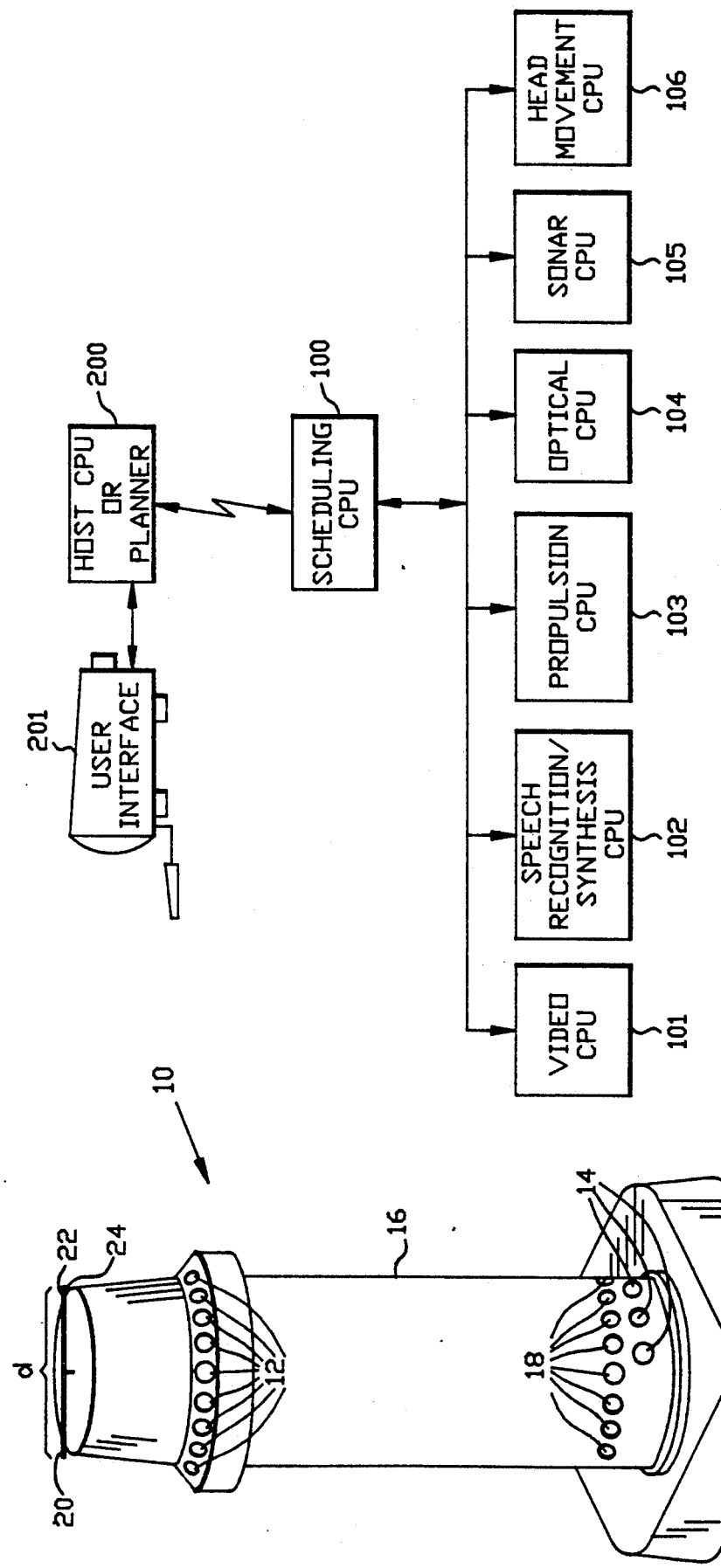

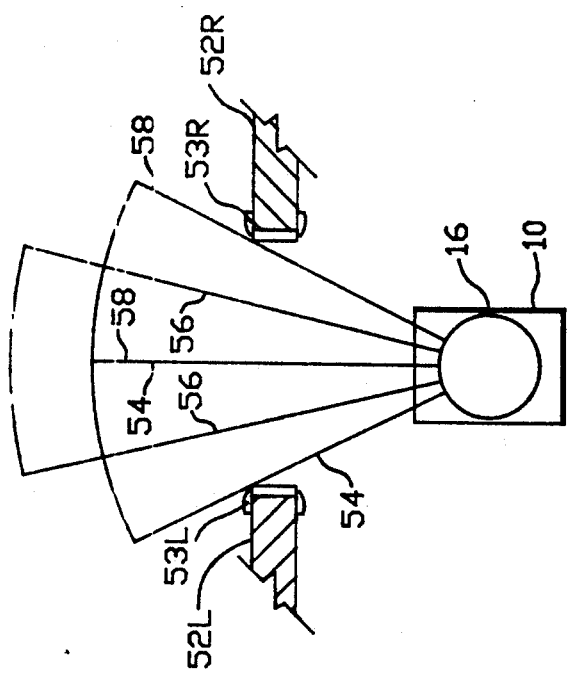
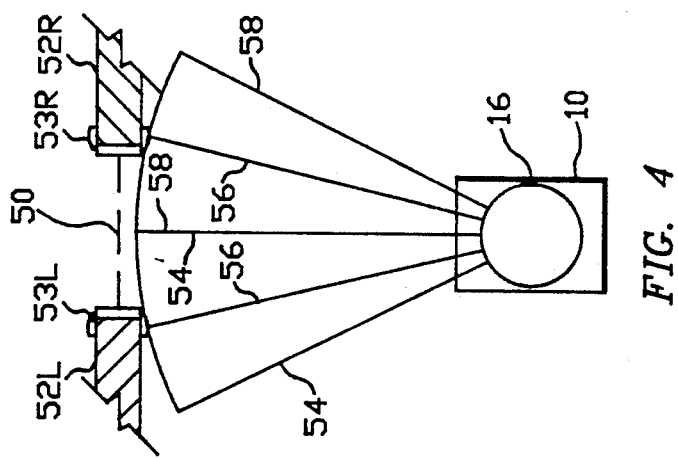
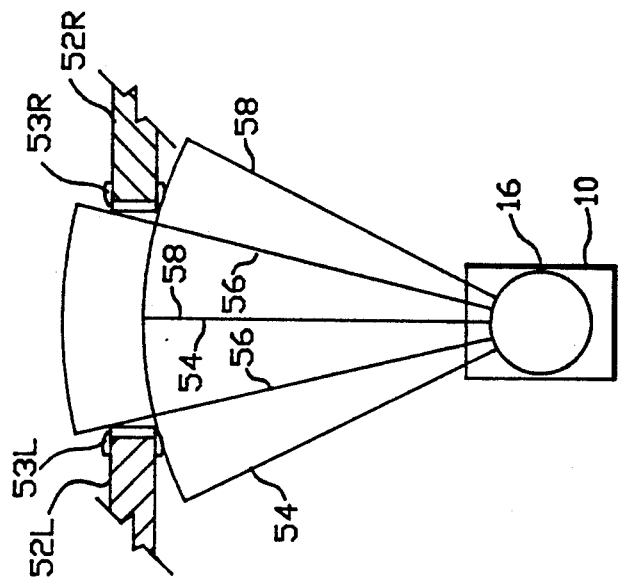

DOORWAY TRANSIT NAVIGATIONAL REFERENCING SYSTEM

STATEMENT OF GOVERNMENT INTEREST

The invention described herein may be manufactured and used by or for the Government of the United States for governmental purposes without the payment of any royalties thereon or therefor.

FIELD OF THE INVENTION

The present invention relates to the field of navigational referencing systems, and more particularly to a navigational referencing system for a mobile robot that derives both x-y positional information and angular orientation of the robot as a natural consequence of transit through a standard, unmodified doorway.

CROSS-REFERENCES TO RELATED APPLICATIONS

The present invention is related issued U.S. Pat. Nos. 4,851,661 (Jul. 25, 1989), 4,857,912 (Aug. 15, 1989), 4,902,887 (Feb. 20, 1990), 5,034,817 (Jul. 23, 1991), 5,045,769 (Sept. 3, 1991) and 5,058,385 (Oct. 22, 1991); and pending U.S. patent application Ser. Nos. 07/531,483 (filed May 29, 1990), 07/593,418 (filed Sept. 28, 1990), 07/697,128 (filed Apr. 18, 1991), 07/719,436 (filed Jun. 24, 1991), and 07/800,341 (filed Nov. 26, 1991), all of which are hereby incorporated by reference.

BACKGROUND OF THE INVENTION

The ultimate goal of a robotics system is of course to perform some useful function in place of its human counterpart. Benefits typically associated with the installation of fixed-location industrial robots are improved effectiveness, higher quality, reductions in manpower, greater efficiency, reliability and cost savings. Additional benefits include the ability to perform tasks for which humans are incapable and the removal of humans from dangerous or life-threatening scenarios. The concept of mobility has always suggested an additional range of applications beyond that of the typical factory floor, wherein free-roaming robots moved about with an added versatility that brought even greater returns. In practice, however, the realization of this dream has been slow in coming.

One of the most significant technological hurdles impeding the widespread introduction of mobile robotics systems arises from the need for a mobile platform to successfully interact with the physical objects and entities in its environment. The robot must be able to navigate from a known position to a desired new location and orientation, at the same time avoiding any contact with fixed or moving objects while enroute. A robust navigational scheme that preserves the validity of a world model for free-roaming platforms has remained an elusive research goal, and for this reason many proposed applications of autonomous mobile robots are yet to be implemented.

The simplest form of autonomous control is sometimes termed guidepath control and involves a navigational control loop which reacts (in a reflexive manner) to the sensed position of some external guiding reference. The intent is to free a human operator from the requirement of steering the moving platform. For example, encoded reflective stripes might be applied to the floor of the robot's environment. The robot would then be equipped with stripe detecting/decoding for determining the robot's position in its environment as provided on the encoded stripes. Such automated guided vehicles (AGVs) have found extensive use in factories and warehouses for material transfer, in modern office scenarios for material and mail pickup and delivery, and in hospitals for delivery of meals and supplies to nursing stations, to name but a few.

Advantages of guidepath control are seen primarily in the improved efficiency and reduction of manpower since an operator is no longer required to guide the vehicle. Large numbers of AGVs can operate simultaneously in a plant or warehouse without getting lost or disoriented. The AGVs are typically scheduled and controlled by a central computer which monitors overall system operation and vehicle flow. Communication with individual vehicles can be via RF links or directional near-infrared modulated light beams, or other means. However, the fundamental disadvantage of guidepath control is the lack of flexibility in the system. A vehicle cannot be commanded to go to a new location unless the guidepath is first modified. This is a significant drawback in the event of changes to product flow lines in assembly plants, or in the case of a security robot which must investigate a potential break-in at a designated remote location.

Thus, truly autonomous control implies the ability of a mobile platform to travel anywhere so desired, subject to nominal considerations of terrain. Many potential applications await an indoor robot that could move in a purposeful fashion from room to room without following a set guidepath, with the intelligence to avoid objects and, if necessary, choose alternative routes of its own planning. To do this, specialized sensors must be coupled with some type of "world modeling" capability that represents the relative/absolute locations of objects detected by these sensors. In this way, a mobile platform can be provided with sufficient awareness of its surroundings to allow it to move about in a realistic fashion, i.e., a path not forever dictated by a guidepath stripe.

The accuracy of this model, which is constructed and refined in a continuous fashion as the robot moves about its workspace, is directly dependent throughout this process upon the validity of the robot's perceived location and orientation. Accumulated dead-reckoning errors can quickly render the information entered into the model invalid in that the associated geographical reference point for data acquired relative to the robot's position is incorrect. As the accuracy of the model degrades, the ability of the robot to successfully navigate and avoid collisions diminishes rapidly, until it fails altogether. One solution to this problem is to provide navigation landmarks within the robot's environment for use by the robot in periodic (absolute) positional updates. The concept of using existing interior doorways as navigation landmarks for a mobile robotics system has always been appealing, in that no modifications to the surrounding environment are required. The robot by necessity must travel through a doorway to enter an adjoining space. If in so doing the system could obtain an accurate positional update, then such would indeed represent an elegant solution to the problem of cumulative dead-reckoning errors.

Thus, the need exists for a navigational referencing system for a mobile robot that can derive its own updated positional information as it moves through its environment. Accordingly, an object of the present invention is to provide a navigational referencing method and system for a mobile robot that derives x-y position and angular orientation of the robot within a world model of the robot's environment as the robot traverses doorway openings. Another object of the present invention is to provide a navigational referencing method and system for a mobile robot that derives a relative x-y position and angular orientation of the robot without any modifications to the robot's environment. Yet another object of the present invention is to provide a method and system of navigational referencing for a mobile robot that provides for sufficient updates to the x-y position and angular orientation of the robot within a world model of the robot's environment thereby avoiding the accumulated effect of navigational dead-reckoning errors.

SUMMARY OF THE INVENTION

In accordance with the present invention, a system of navigational referencing for a robot moving within a defined space is provided. A database contains positional information on the defined space in terms of the location of known objects to include a plurality of doorway openings. Each doorway opening has left, right and top door frames that define first and second imaginary vertical planes at the beginning and ending, respectively, of each doorway opening. The first and second imaginary vertical planes further are orthogonal to the floor of the defined space. The first and second imaginary vertical planes for each of the plurality of doorway openings are also defined in terms of an x-y coordinate system. A mobile robot is provided that has the capability to access the database, define its location in terms of an approximate position within the x-y coordinate system, and sense the presence of one of the plurality of doorway openings. The robot is positioned and moved along a path that traverses the one doorway opening at a known speed. The top door frame is detected from a first and second sensor position on the robot when the first and second sensor positions break the first imaginary vertical plane. The first and second sensor positions are separated by a known distance along a line orthogonal to the path that traverses the one doorway opening. An angular orientation α of the robot within the x-y coordinate system is based on a time difference between when the first and second sensor positions break the first imaginary vertical plane, the known speed of the robot and the known separation distance between the first and second sensor positions. A y-coordinate position of the robot within the x-y coordinate system is based on the positional information available from the database on the first imaginary vertical plane when the first or second sensing position breaks therethrough. A lateral position of the robot with respect to the one doorway opening is determined during a portion of the time between the first sensor position breaking the first imaginary vertical plane and the second sensor position breaking the second imaginary vertical plane. The lateral position is compared with the positional information from the database on the one doorway opening in order to determine an x-coordinate of the robot within the x-y coordinate system.

DESCRIPTION OF THE DRAWINGS

FIG. 1 is a perspective view of a mobile robot used in the navigational referencing system and method of the present invention;

FIG. 2 is a block diagram of the various central processing units that may be used by the present invention;

FIG. 4 is a top view of the mobile robot outputting three acoustic beams as it approaches an expanded view of a doorway opening;

FIG. 5 is a top view of the mobile robot of FIG. 4 as it gets closer to the doorway opening;

FIG. 6 is a top view of the mobile robot of FIG. 5 just before it enters the doorway opening;

DESCRIPTION OF THE PREFERRED EMBODIMENT

Figure 3:
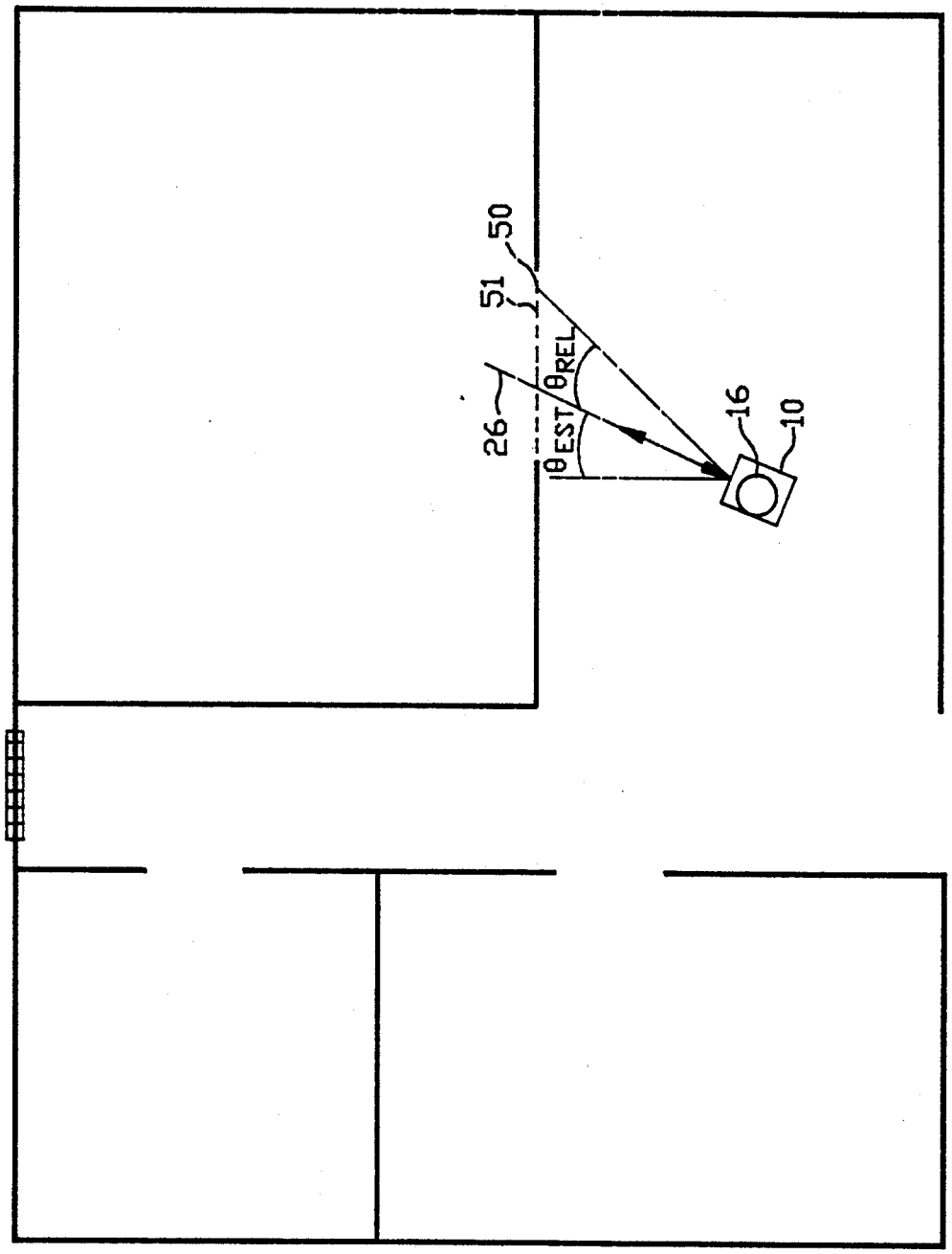
FIG. 3 is a two-dimensional top view of a simple floor plan having the mobile robot positioned in the vicinity of a doorway opening.

A navigational referencing system for a mobile robot that utilized doorway openings as positional and angular orientation reference points would typically carry out the following tasks:

1) Find the doorway.
2) Verify the doorway.
3) Enter the doorway.
4) Determine longitudinal position or y-coordinate of the robot relative to the doorway.
5) Determine angular orientation α of the robot relative to the doorway.
6) Determine lateral position or x-coordinate of the robot relative to the doorway.
7) Convert relative x, y, α to absolute.

It is to be appreciated that tasks 4, 5 and 6 contain the novel aspects of the present invention. However, for a more complete understanding of the present invention, tasks 1, 2, 3 and 7 will also be described hereinbelow. Furthermore, it is to be understood at the outset that the present invention is not limited to the preferred embodiment system in order to carry out the above tasks.

Referring now to the drawings, and in particular to FIG. 1, a perspective view of a mobile robot 10 is shown. Robot 10 may house a variety of sensors, cameras, receivers, transmitters, etc. However, for sake of simplicity, only those elements pertaining to navigational referencing will be shown and described herein. Similarly, propulsion systems, drive trains and various other mechanical aspects of robot 10 may be designed to suit a particular need based on well known state-of-the-art robotics systems. Since these are not critical considerations with respect to tasks 4, 5 and 6, details of these aspects of robot 10 have been omitted.

Typically, robot 10 has an onboard scheduling CPU (central processing unit) 100 shown in the functional block diagram of FIG. 2. Scheduling CPU or scheduler 100 is provided with the capability of communicating (for example, via a radio link) with a host CPU or planner 200. For purposes of the present invention, planner 200 maintains a world model or floor plan (e.g. an x-y coordinate system) of the robot's operating environment. In particular, planner 200 knows the absolute position of each doorway opening in the robot's operating environment with respect to the absolute x-y coordinate system. The floor plan maintained by planner 200 is typically initialized by means of a user interface 201 such as a personal computer. The floor plan may be generated by any conventional computer aided design package.

Scheduler 100 also communicates with a plurality of onboard sensor processing (data acquisition) CPUs to assimilate data received and processed by the onboard sensors and associated CPU's. Examples of such CPU's include, but are not limited to, a video CPU 101 for processing video signals from an onboard video camera, a speech recognition/synthesis CPU 102 for voice command processing, a propulsion CPU 103 for controlling the robot's propulsion drive train system, an optical CPU 104 for receiving/processing optical sensor information, a sonar CPU 105 for receiving/processing ultrasonic sonar sensor information, and a pan axis controller CPU 106 for controlling rotational movement of the robot's head 16.

The first of the aforementioned tasks, or finding the doorway, may be addressed in a variety of ways. One approach is to use a plurality of ultrasonic ranging sensors 18 mounted around the periphery of robot 10 in conjunction with a plurality of optical proximity sensors 14. Ultrasonic ranging sensors 18 are typically capable of accurately measuring distance but have a poor angular resolution. This shortfall is compensated for by the fact that optical proximity sensors 14 generally have superior angular resolution at the expense of little or no ranging capability. For purposes of the present invention, it will be assumed that planner 200 and scheduler 100 work together with inputs from sensors 12 and 14 to direct the robot to a specified absolute position from which a doorway opening could be found. It will also be assumed that the robot knows its approximate position within the x-y coordinate system. The robot's actual position within the x-y coordinate system is said to be known approximately because during the time since its last positional update, robot 10 may have accumulated minor enroute dead-reckoning errors and may have experienced real-world terrain traversability problems (i.e. wheel slippage).

Reference will also be made now to a simple floor plan for purposes of describing the robot's task of finding a doorway opening. In the two-dimensional top view of FIG. 3, the robot will be assumed to have traveled to a position that is aligned with the center 51 of doorway opening 50 as shown by the dotted line representation of the robot referenced by numeral 10a. However, due to the aforementioned dead-reckoning errors and traversability problems, the robot is actually positioned as shown by the solid line representation of the robot referenced by numeral 10.

To find doorway opening 50 once robot 10 is in the vicinity of same, planner 200 informs scheduler 100 of a path segment 26a extending from (the assumed position) robot 10a that is thought to penetrate doorway opening 50 at its center 51. Planner 200 provides an estimated bearing $\theta_{EST}$ and distance to doorway opening 50. For sake of simplicity, it will further be assumed that planner 200 has oriented (the assumed position) robot 10a onto the path segment 26a that actually penetrates doorway opening 50 orthogonal to the doorway opening's associated wall, i.e. $\theta_{EST}=90°$. Scheduler 100 then rotates the head 16 of (the actual position) robot 10 to the estimated bearing $\theta_{EST}$. This points an optical proximity sensor 15 located on head 16 at door opening 50 in order to begin the task of verifying the doorway opening. Alternatively, an array of fixed proximity sensors, such as optical proximity sensors 14, could be operated sequentially to simulate rotation of head 16.

Unless robot 10 is significantly misaligned due to previously accumulated dead-reckoning errors, proximity sensor 15 will return a "no target" condition, as it looks through doorway opening 50. If this is not the case, head 16 begins scanning 15° to either side of the estimated bearing $\theta_{EST}$ in an attempt to find doorway opening 50. If this search fails to locate doorway opening 50, an error condition is returned informing planner 200 that robot 10 is either significantly lost or the door associated with the opening is closed.

Assuming doorway opening 50 is detected, scheduler 100 next attempts to locate the left and right edges of doorway opening 50. One way of accomplishing this is to pan head 16 while processing output from proximity sensor 15 for a "target" condition. A "target" condition is indicative of energy being reflected from the doorway opening frames and adjacent wall areas on either side thereof. Since robot 10 is typically not aligned with the center 51 of doorway opening 50, position angles of head 16 corresponding to the left and right boundaries of the doorway opening are averaged to yield a relative bearing $\theta_{REL}$ to the center 51 of doorway opening 50. (Note that the relationship between the estimated bearing $\theta_{EST}$ and the relative bearing $\theta_{REL}$ has been exaggerated for purposes of clarity. In reality, this difference is on the order of one or two degrees.)

Scheduler 100 then alters the heading of robot 10 to be coincident with the relative bearing $\theta_{REL}$ to the actual center 51 of doorway opening 50. At this point, the task of entering the doorway begins. One acceptable approach begins with processing (at sonar CPU 105) sonar data received from a plurality of sonar transducers 18 as robot 10 moves along the relative bearing $\theta_{REL}$ to the center 51 of doorway opening 50. Measured distance to doorway opening 50 should be within a specified tolerance of the estimated range provided by planner 200, less any distance traveled in the interim. Three (or more) of the transducers 18 balanced about the relative bearing $\theta_{REL}$ could be focused so that those transducers indicate ranges with the specified tolerance at a specified range. This is easily explained by way of example with reference to FIGS. 4–6 where robot 10 is shown on an orthogonal approach to a doorway opening.

FIG. 4 is an expanded top view of a doorway opening 50, bounded by left and right walls 52L and 52R which are shown in cross-section. Walls 52L and 52R in turn support left and right door frames 53L and 53R. The top portion of doorway opening 50 is omitted from FIG. 4 for purposes of clarity. As robot 10 approaches doorway opening 50, three sonar ranging beams: a left beam 54, a center beam 56 and a right beam 58, propagate towards doorway opening 50. For complete ranging coverage, beams 54 and 56 and 58 overlap as shown. Thus, the transducers "ranging" on beams 54, 56 and 58 should all indicate a range commensurate with the estimated range.

As robot 10 closes on doorway opening 50, the center beam 56 will break through opening 50 as shown in FIG. 5. A corresponding increase in range measurement will result from the transducer producing center beam 56. Assuming robot 10 is perfectly aligned with opening 50, beam "break through" of center beam 56 occurs at a range where its effective beam width becomes less than the width of opening 50. However, since perfect alignment is atypical, a slight delay in beam break through results as center beam 56 narrows (with respect to opening 50) on approach. Beams 54 and 58 continue to strike frames 53L and 53R as robot 10 approaches opening 50. Thus, the range to opening 50 is continuously measured by beams 54 and 58 as robot 10 approaches the opening. Similar to center beam 56, left beam 54 and right beam 58 will eventually break through opening 50 as shown in FIG. 6. This process allows for verification of doorway detection as the beams are observed to break through at the predicted ranges.

Figure 7:
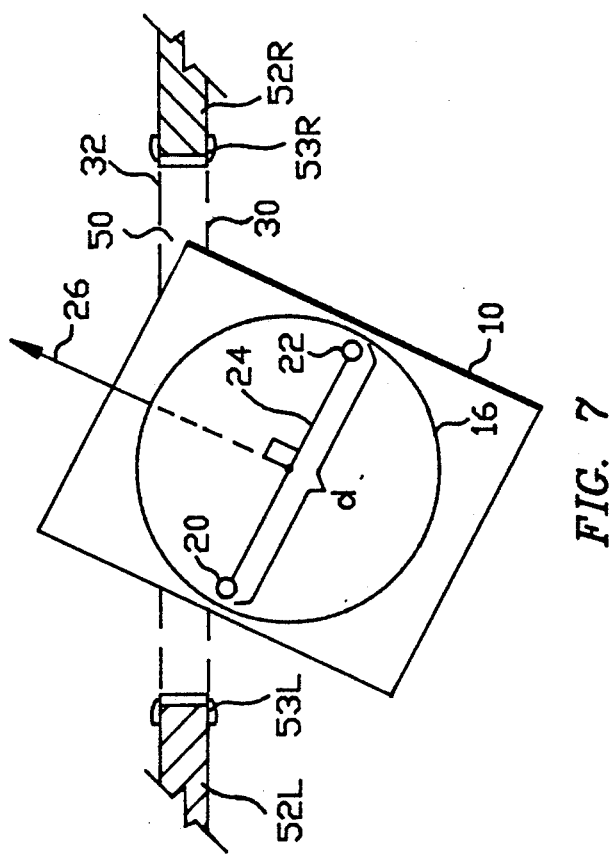
FIG. 7 is a top view of the mobile robot as it breaks the first imaginary vertical plane formed by the doorway opening.

As robot 10 enters doorway opening 50 and passes there through, the present invention executes its novel approach to accomplishing tasks 4, 5 and 6. Referring again to FIG. 1, two sensing positions 20 and 22 are located on top of robot 10 as shown. Sensing positions 20 and 22 are fixed in relationship to one another on a mounting bar 24 and are separated by a known distance d. As shown in the top view of FIG. 7, mounting bar 24 (and hence sensing positions 20 and 22) is maintained in an orthogonal relationship with respect the robot's path 26. Dotted lines 30 and 32 represent two imaginary vertical planes formed at doorway opening 50 between the left and right doorway frames 53L and 53R and the top doorway frame (not shown in this view). Each vertical plane 30 and 32 is perpendicular to the floor and is defined two dimensionally within the x-y coordinate system of planner 200. Thus, accurate detection of vertical plane 30 (or vertical plane 32 if robot 10 is approaching opening 50 from the opposite direction) allows the robot to start the process that updates its actual position within the x-y coordinate system maintained by planner 200. As shown, vertical plane 30 is defined by the leading edge of the door frame (with respect to the robot's position and movement) while vertical plane 32 is defined by the trailing edge of the door frame.

Accurate detection of plane 30 is achieved in the present invention by orienting sensors placed at sensing positions 20 and 22 so that their beams are focused vertically and orthogonal to the path 26 of robot 10, so as to detect the top of the door frame of doorway opening 50. In the example shown, sensing position 20 breaks vertical plane 30 prior to sensing position 22. (However, their situation could just as easily be reversed if robot 10 approached opening 50 from a different heading.) By focusing sensor beams from sensing position 20 vertically, numerous problems generally associated with prior art approaches that detect the left and right door frames 53L and 53R, respectively, (e.g. varying widths of doorway openings and/or presence of objects near doorway opening 50 such as the door itself) are eliminated. This is because the top frame of most doorway openings, unlike its sides, is typically unobstructed and is located at a standard height of approximately 80 inches above the floor. Accordingly, sensors placed at positions 20 and 22 can be limited to focus region that is essentially sensitive only to the height of the top door frame of a traversed doorway opening.

Figure 8:
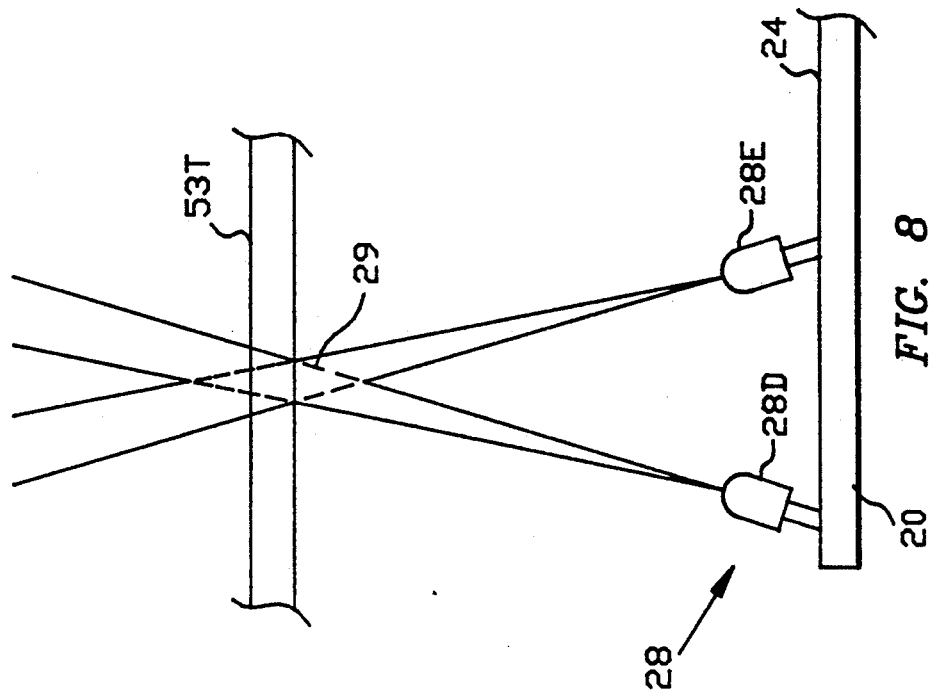
FIG. 8 is a side view of a sensor pair focused to detect the top door frame of the doorway opening.

One implementation of such a sensing arrangement is shown in FIG. 8 and is applicable for use at both sensing positions 20 and 22. A sensor pair 28 includes an emitter 28E and detector 28D mounted on mounting bar 24. Emitter 28E and detector 28D could be near-infrared optical proximity sensors configured in the convergent mode. Such sensors produce beams that can be tightly focused.

Emitter 28E and detector 28D are centered about sensing position 20 (or sensing position 22). Sensor pair 28 is focused so that a zone of possible detection, referenced by the dotted line area 29, would be centered at a height approximately equal to the top door frame 53T (shown only in section). In this way, as sensing position 20 breaks the imaginary vertical plane 30, the leading edge of top door frame 53T will be detected. Since there are typically no obstructions at top door frame 53T, the accuracy of detecting vertical plane 30 is maximized. At time of detection, scheduler 100 obtains a longitudinal position (or y-coordinate) fix based on positional information on vertical plane 30 stored in planner 200.

As robot 10 traverses doorway opening 50, another sensor pair (not shown but identical to sensor pair 28) positioned at sensing position 22 will break through vertical plane 30. It is as this point in time that angular orientation $\alpha$ of the robot 10 with respect to the doorway opening can be determined in accordance with the formula $$\alpha = \sin^{-1} \frac{V \cdot T}{d} \quad (1)$$

where

V is the speed of robot 10,

T is the time difference between when sensing positions 20 and 22 break through vertical plane 30 as measured, for example, by a clock maintained on-board robot 10 or scheduler 100, and d is the known separation distance between sensing positions 20 and 22.

The final task in the navigational referencing procedure is to determine lateral position (or the x-coordinate) of robot 10 with respect to doorway opening 50. A method of achieving this is by applying one of many well known acoustic time-of-flight ranging techniques. For example, as sensing position 20 breaks imaginary vertical plane 30, two of the ultrasonic ranging sensors 12 (FIG. 1) that are approximately orthogonal to doorway opening 50 could be configured to begin sonar ranging (i.e. "pinging"). The two sensors chosen should be capable of detecting the left and right door frames, respectively. Note that "approximately orthogonal" is sufficient since such sensors typically have a beam width of 30° while the robot is typically misaligned by less than 10°. Pinging could take the form of single pings or be continued until sensing position 20 breaks imaginary vertical plane 32. Alternatively, pinging could continue until sensing position 22 breaks vertical plane 32. In either case, the resulting acoustic range profile could be processed so that simultaneous left (door frame) and right (door frame) created range minimums would add together to yield the width of doorway opening 50. Ranges are reported relative to the vertical axis of the robot. Scheduler 100 can then use these left and right range values as the basis for determining the lateral position of robot 10 relative to the x-coordinates of doorway opening 50 maintained by planner 200. For example, if the left and right range values were both 18 inches, planner 200 would know that the robot was centered in the doorway opening. If, however, the left range value was 16 inches and the right range value was 20 inches, planner 200 would know that the robot was 2 inches too far to the left. Finally, since planner 200 knows the doorway measurements and orientation in terms of the absolute x-y coordinate system, it is able to resolve ambiguities between the robot's assumed position and the robot's actual position with respect to the doorway opening. Thus, planner 200 converts the longitudinal position, lateral position and angular orientation of the robot relative to the doorway opening into the absolute coordinates of the x-y coordinate system.

The advantages of the present invention are numerous. First, the navigational referencing system and method of the present invention allows a mobile robot to accurately update its position within its environment every time the robot traverses a doorway opening. Therefore, any accumulation of dead-reckoning errors is minimized. In addition, no doorway opening need be modified to accommodate this robust navigational referencing system. Thus, the present invention is easily adaptable to any existing structure as long as a database of the floor plan is made available to the referencing system in terms of an x-y coordinate system (or other suitable coordinate system). Further, by focusing proximity sensors vertically, detection of the doorway opening (via the top door frame) is not affected by the width of the doorway opening or other adjacent objects in the robot's surrounding environment. Finally, since heights of doorway openings are for the most part standard, the present invention will be able to provide accurate navigational referencing in many existing structures. The present invention can also be readily adapted to non-standard door heights as long as they are consistent.

Although the invention has been described relative to a specific embodiment thereof, there are numerous variations and modifications that will be readily apparent to those skilled in the art in the light of the above teachings. For example, verification of the angular orientation o could easily be achieved by taking similar sensor measurements as sensing positions 20 and 22 break through imaginary vertical plane 32 defined by the trailing edge of the door frame. In addition, the measured distance between vertical planes 30 and 32 could easily be calculated from the equation $$V^*T_T \cos\alpha \qquad (2)$$

where $T_T$ is the total time between leading edge detection of vertical plane 30 and trailing edge detection of vertical plane 32.

This would serve as a means of verifying that the robot was indeed passing through a doorway opening of known dimensions and not under some other overhead target (e.g. EXIT sign, duct work, etc.). Further, the use of doorway openings could be replaced by some other fixed and known location overhead structural detail such as beams. Finally, the proximity sensors could be replaced with video cameras as a means of detecting the top door frame. It is therefore to be understood that, within the scope of the appended claims, the invention may be practiced other than as specifically described.

What is claimed as new and desired to be secured by letters patent of the United States is:

1. A method of navigational referencing for a robot which moves within a defined space comprising the steps of:

providing the robot with positional information on the defined space in terms of plurality of doorway openings, each doorway opening having left, right and top door frames defining first and second imaginary vertical planes at the beginning and ending, respectively, of each doorway opening, the first and second imaginary vertical planes further being orthogonal to the floor of the defined space, wherein the first and second imaginary vertical planes for each of the plurality of doorway openings are defined in terms of an x-y coordinate system;

finding one of the plurality of doorway openings;

positioning the robot on a heading to traverse said one doorway opening;

moving the robot along a path defined by the heading in order to traverse said one doorway opening at a known speed;

detecting the top door frame from a first sensor position on the robot when the first sensor position enters the first imaginary vertical plane;

detecting the top door frame from a second sensor position on the robot when the second sensor position enters the first imaginary vertical plane, wherein the first and second sensor positions are separated by a known distance along a line orthogonal to the path defined by the robot's heading;

measuring a time difference between when the first and second sensor positions break the first imaginary vertical plane, wherein an angular orientation $\alpha$ of the robot within the x-y coordinate system is based on the measured time difference, the known speed of the robot and the known separation distance between the first and second sensor positions, and a y-coordinate position of the robot within the x-y coordinate system is based on the provided positional information on the first imaginary vertical plane when the first or second sensing position enters said first imaginary vertical plane; and determining a lateral position of the robot with respect to said one doorway opening during a portion of the time between the first sensor position entering the first imaginary vertical plane and the second sensor position entering the second imaginary vertical plane, wherein the lateral position is compared with the provided positional information of said one doorway opening in order to determine an x-coordinate of the robot within the x-y coordinate system.

2. A method according to claim 1 wherein the angular orientation $\alpha$ of the robot within the x-y coordinate system is equal to $$\sin^{-1}\frac{V^*T}{d}$$

where

V is the known speed of the robot,

T is the measured time difference between when the first and second sensor positions break the first imaginary vertical plane, and d is the known separation distance between the first and second sensor positions.

3. A method according to claim 1 wherein said step of determining the lateral position of the robot includes the step of measuring a distance to the left and right door frames during the portion of the time between the first sensor position entering the first imaginary vertical plane and the second sensor position entering second imaginary vertical plane.

4. A method according to claim 3 wherein the distance to the left and right door frames is determined by acoustic time-of-flight techniques.

5. A system of navigational referencing within a defined space comprising:

a database containing positional information on the defined space in terms of a plurality of doorway openings, each doorway opening having left, right and top door frames defining first and second imaginary vertical planes at the beginning and ending, respectively, of each doorway opening, the first and second imaginary vertical planes further being orthogonal to the floor of the defined space, wherein the first and second imaginary vertical planes for each of the plurality of doorway openings are defined in terms of an x-y coordinate system;

a mobile robot having the capability to access said database, define its location in terms of an approximate position within said x-y coordinate system, and sense the presence of one of said plurality of doorway openings;

means for positioning and moving the robot along a path that traverses said one doorway opening at a known speed;

means for detecting the top door frame from a first and second sensor position on the robot when the first and second sensor positions break the first imaginary vertical plane, wherein the first and second sensor positions are separated by a known distance along a line orthogonal to the path that traverses the one doorway opening, wherein an angular orientation α of the robot within the x-y coordinate system is based on a time difference between when the first and second sensor positions break the first imaginary vertical plane, the known speed of the robot and the known separation distance between the first and second sensor positions, and a y-coordinate position of the robot within the x-y coordinate system is based on the positional information available from said database on the first imaginary vertical plane when the first or second sensing position enters said first imaginary vertical plane; and means for determining a lateral position of the robot with respect to the one doorway opening during a portion of the time between the first sensor position entering the first imaginary vertical plane and the second sensor position entering the second imaginary vertical plane, wherein the lateral position is compared with the positional information from said database on said one doorway opening in order to determine an x-coordinate of the robot within the x-y coordinate system.

6. A system as in claim 5 wherein the angular orientation α of the robot within the x-y coordinate system is equal to $$\sin^{-1} \frac{V \cdot T}{d}$$

where
V is the known speed of the robot,
T is the time difference between when the first and second sensor positions break the first imaginary vertical plane, and
d is the known separation distance between the first and second sensor positions.

7. A system as in claim 5 wherein said means for detecting the top door frame comprises first and second proximity sensors at said first and second sensor positions, respectively.

8. A system as in claim 7 wherein each of said proximity sensors comprises a proximity sensor pair, each sensor pair including an emitter having an emitter beam and a detector having a detecting beam, wherein said emitter beam and detection beam are focused to intersect in a zone, whereby the top door frame of the one door opening passes through the zone as the robot traverses the one doorway opening.

9. A system as in claim 8 wherein said emitter and said detector operate in a convergent-mode in a near-infrared region.

10. A system as in claim 5 wherein said means for determining the lateral position of the robot comprises means for measuring a distance from the robot to the left and right door frames, respectively.

11. A system as in claim 10 wherein said means for measuring a distance comprises acoustic range finders activated when the first sensor position enters the first imaginary vertical plane and deactivated when the second sensor position enters the second imaginary vertical plane.

* * * * *